(12) United States Patent
Sutoh et al.

(10) Patent No.: US 7,099,901 B2
(45) Date of Patent: Aug. 29, 2006

(54) METHOD FOR BACKING UP A DISK ARRAY SYSTEM

(75) Inventors: Atsushi Sutoh, Kokubunji (JP); Shinji Fujiwara, Sagamihara (JP); Manabu Kitamura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 264 days.

(21) Appl. No.: 10/228,292

(22) Filed: Aug. 27, 2002

(65) Prior Publication Data

US 2004/0019615 A1 Jan. 29, 2004

(30) Foreign Application Priority Data

Jul. 23, 2002 (JP) ............................. 2002-213244

(51) Int. Cl.
*G06F 17/30* (2006.01)

(52) U.S. Cl. .................................... 707/204

(58) Field of Classification Search ........ 707/200–206; 711/161–162
See application file for complete search history.

(56) References Cited

U.S. PATENT DOCUMENTS 6,549,992 B1 * 4/2003 Armangau et al. ......... 711/162
6,651,074 B1 * 11/2003 Taylor ....................... 707/204
6,804,690 B1 * 10/2004 Dysert et al. ............... 707/204

FOREIGN PATENT DOCUMENTS

| JP | 2000-112669 | 10/1998 |
|----|-------------|---------|
| JP | 2000-347811 | 6/1999  |

* cited by examiner

*Primary Examiner*—Jean M. Corrielus
*Assistant Examiner*—Joon Hwan Hwang
(74) *Attorney, Agent, or Firm*—Reed Smith LLP; Stanley P. Fisher, Esq.; Juan Carlos A. Marquez, Esq.

(57) ABSTRACT

A method for backing up the data of a disk array system having network file server and storage area network functions easily and rapidly without using a route for data to be not backed up. Upon receipt of a backup request, a network file server module copies files on the disk array system's regular volumes to a backup volume. The network file server module then requests a storage area network module to copy the files to an external storage device. Finally, the storage area network module copies the current contents of the backup volume to the external storage device. The network file server module can limit the data to be backed up, thereby reducing the backup time requirements. The load on a LAN does not increase because the storage area network module acquires the data to be backed up. The processing speed increases thanks to backup load distribution within the disk array system.

9 Claims, 4 Drawing Sheets

METHOD FOR BACKING UP A DISK ARRAY SYSTEM

CROSS-REFERENCE TO RELATED APPLICATION

This application is related to U.S. patent application Ser. No. 10/020,313 filed on Dec. 18, 2001, entitled "Storage System, a Method of File Data Backup and a Method of Copying of File Data," the disclosure of which is hereby incorporated by reference.

BACKGROUND OF THE INVENTION

The present invention relates to a disk array system, and more particularly to a control method for backing up its data to an external device.

For backing up the data of a disk array system, a differential backup method can be used to prevent the size of backup data from being enormously increased.

Using a file basis differential backup method for a disk array system having a network file server function and a storage area network function increases the load on a local area network that is used for data exchange during regular operation by host computers. Because the storage area network function cannot specify files and the network file server function has to be used for the method. In some cases, it is necessary to make a backup while regular operations implemented by the network file server function are halted.

Meanwhile, the disk array system having the network file server function and storage area network function uses a technology called "NAS over SAN". When this technology is used, the data passing through a local area network is limited to file names, file attributes, and other items of file information, and the data contained in files are exchanged via a storage area network. When a backup is made with this technology, the backup data and the data exchanged for regular operations both pass through a storage area network.

In a system described in JP-A No. 112669/2000, a disk unit is provided with an area for temporarily storing backup data for the purpose of adjusting the speeds of the disk unit and external backup storage. This area does not store part of backup data and cannot possibly reduce the size of backup data.

In a system described in JP-A No. 347811/2000, a volume of a disk unit is made redundant for data storage purposes. This system can back up data within the disk unit. However, if the data is to be transferred out to an external device, the size of backup data does not decrease.

SUMMARY OF THE INVENTION

The present invention aims at providing a means of easily making a rapid backup of a disk array system having a network file server function and storage area network function using a path separate from those for non-backup data and without increasing the load on a local area network.

Files to be backed up are dispersed to two or more volumes of a disk array system.

In one aspect of the invention, the network file server function is first exercised to select the files to be backed up on an individual file basis and copy them onto a specific backup volume (primary backup). Next, the storage area network function is notified of the termination of the primary backup process. Upon receipt of such a notification, the storage area network function copies the backup volume to an external storage device to complete the backup process.

More specifically, a correlation table is created in the above-mentioned primary backup sequence to indicate copy-source disk volumes to which the individual files to be retained on the backup volume belong. Typically, the correlation table is also stored as a file on the backup volume. That is, the correction table is copied to an external storage device together with backup files when a backup is made by the storage area network function.

Typically, restoration of backup data is achieved by reversing the above-mentioned backup steps. That is, restoration data stored in an external storage device is entered in the disk array system by the storage area network function. In this instance, the disk array is provided with a specific restoration volume, which stores the whole restoration data. Next, the backups of individual files contained in the restoration data are copied to the original disk volumes by the network file server function. The restoration process is then completed.

Other and further objects, features and advantages of the invention will appear more fully from the following description.

DETAILED DESCRIPTION OF THE PREFERRED EMBODIMENTS

Figure 1:
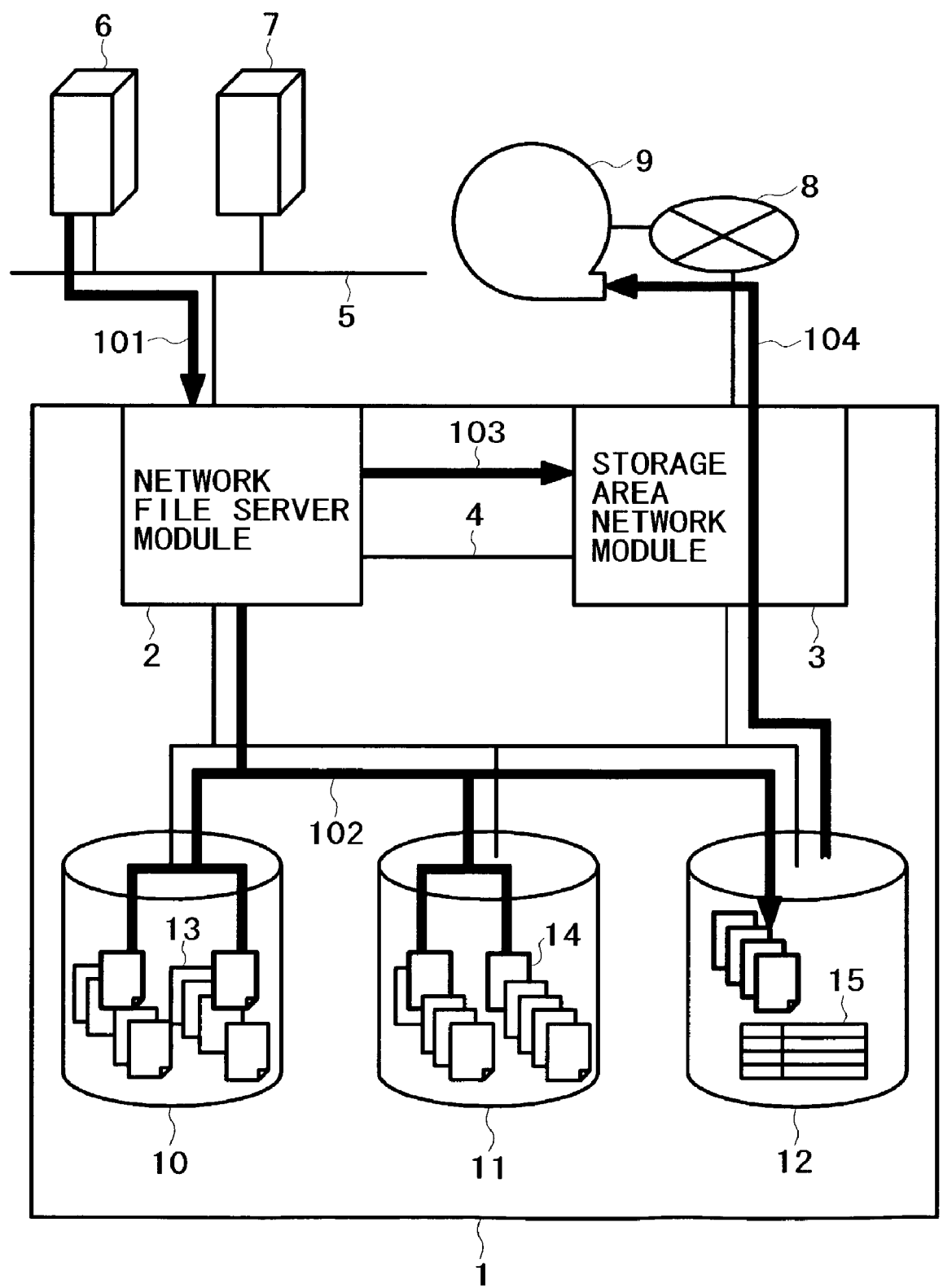
FIG. 1 is a conceptual diagram illustrating a backup method according to a preferred embodiment of the invention.

FIG. 1 diagrammatizes the disk array system structure and backup operation according to one embodiment of the invention.

A disk array system 1 has a network file server module 2, which is connected to a local area network 5, and a storage area network module 3, which is connected to an external storage device 9 via a storage area network 8. Both of these modules can access disk volumes 10 and 11. In addition, a backup disk volume 12 is formed for use in data backup and data restoration. Direct communication can be established between the network file server module 2 and storage area network module 3 through an inter-module communication function 4. The local area network 5 is connected to a management computer 6 that manages the disk array system 1 and a host computer 7. Typically, a magnetic tape storage device, magneto-optical disk storage device, or other storage device is used as the external storage device 9.

The subsequent explanation presumes that the disk array system has one unit each of the network file server module 2 and storage area network module 3. However, the number of units does not have to be limited at 1. The invention is also applicable to situations where the disk array system 1 has two or more units each of the network file server module 2 and storage area network module 3.

The subsequent explanation also presumes that the inter-module communication function 4 provides direct communication within the disk array system 1. However, the invention is also applicable to situations where the employed communication function provides communication via a device external to the disk array system 1 or via a network.

In the system shown in FIG. 1, the disk data is backed up onto an external storage device 9 in the following sequence:

[First Backup Step]

Typically, a backup operation starts when a management computer 6 issues a backup request to the disk array system 1. The backup request is forwarded to a network file server module 2 of the disk array system 1 via the route indicated by the reference numeral 101 in FIG. 1, that is, a local area network 5. The backup request reports the specified files to be backed up 14, the specified backup volume 12, and other conditions.

Note that the files to be backed up 14 are not always specified by a backup request issued by the management computer 6. The file for specifying the files to be backed up (backup correlation table) may be provided on a volume of the disk array system 1 and used to specify the files to be backed up. In this instance, the backup request issued by the management computer 6 specifies the name of the file that carries the backup correlation table. The network file server module 2, which receives the backup request, reads the specified backup correlation table and specifies the files to be backed up. When these two methods of specifying the files to be backed up are made available, the disk array system can be flexibly operated.

Further, the backup of the disk array system 1 can be alternatively started, for instance, at fixed intervals specified by a timer, not shown, which is provided inside the disk array system 1, or directly by the network file server module 2, without being triggered by the receipt of a backup request from an external computer 6 or 7, which is connected to a local area network 5.

[Second Backup Step]

Upon receipt of a backup request, the network file server module 2 copies the files 14 specified by the backup request to a backup volume 12 specified by the backup request. In this instance, the module stores the correlation between the copied files and their respective copy source disk volumes in the correlation table 15 on the backup volume 12. This correlation storage operation is indicated by the reference numeral 102 in FIG. 1. This copy operation concludes the primary backup process.

Note that the term "backup volume 12" does not always represent one disk volume. Two or more disk volumes can be used as backup volumes 12. Further, a virtual volume can be used as a backup volume 12. Furthermore, a backup volume 12 can be created within a memory.

[Third Backup Step]

When the specified files 14 are completely copied to the backup volume 12 (primary backup), the inter-module communication function 4 sends a copy request 103 from the network file server module 2 to the storage area network module 3. This copy request 103 requests that the backup volume be copied to an external storage device.

[Fourth Backup Step]

Upon receipt of the request for copying the backup volume 12 to the external storage device 9, the storage area network module 3 copies the backup volume 12 to the external storage device 9 via the storage area network 8. In this instance, the correlation table 15 on the volume 12 indicates the locations of the disk volumes on which the files stored on the backup volume 12 were originally stored. When the backup volume 12 is copied to the external storage device 9, the correlation table 15 is also copied to the external storage device 9. The reference numeral 104 in FIG. 1 indicates the route over which the copy operation is performed. When this copy operation ends, the secondary backup process is completed for the specified files 14.

The above disk data backup is performed over a route other than the local area network 5, which is used for disk access from the host computer 7 and other regular operations of the disk array system 1. Therefore, the backup can be completed while the influence upon regular operations is minimized. Further, the backup data size will not unduly increase because the backup target can be specified on an individual file basis.

The request for copying the backup volume 12 to the external storage device 9 does not always have to be issued at the end of each file copy operation performed for the backup volume 12 as described in the above third backup step. The request for copying can be issued in some modified ways. For example, the request can be issued in accordance with the size of the file data copied to the backup volume 12, issued in compliance with a backup request received by the network file server module 2, or issued in accordance with a timer in the disk array system 1. These modifications will reduce the number of times the backup data is to be copied to the external storage device 9.

When specified files are completely copied to the backup volume 12, the backup of these files is saved within the same disk array system. In other words, the data on the backup volume 12 may be valid for restoration if the file data in disk volumes 10 and 11 is damaged.

The number of external storage device 9 to which the backup volume 12 is to be copied should not be limited at 1. The backup volume 12 can be copied to each of two or more units of the external storage device or divided into segments and then copied separately to two or more units of the external storage device.

The data restoration procedure of one embodiment of the invention is described below with reference to FIG. 2.

[First Restoration Step]

Figure 2:
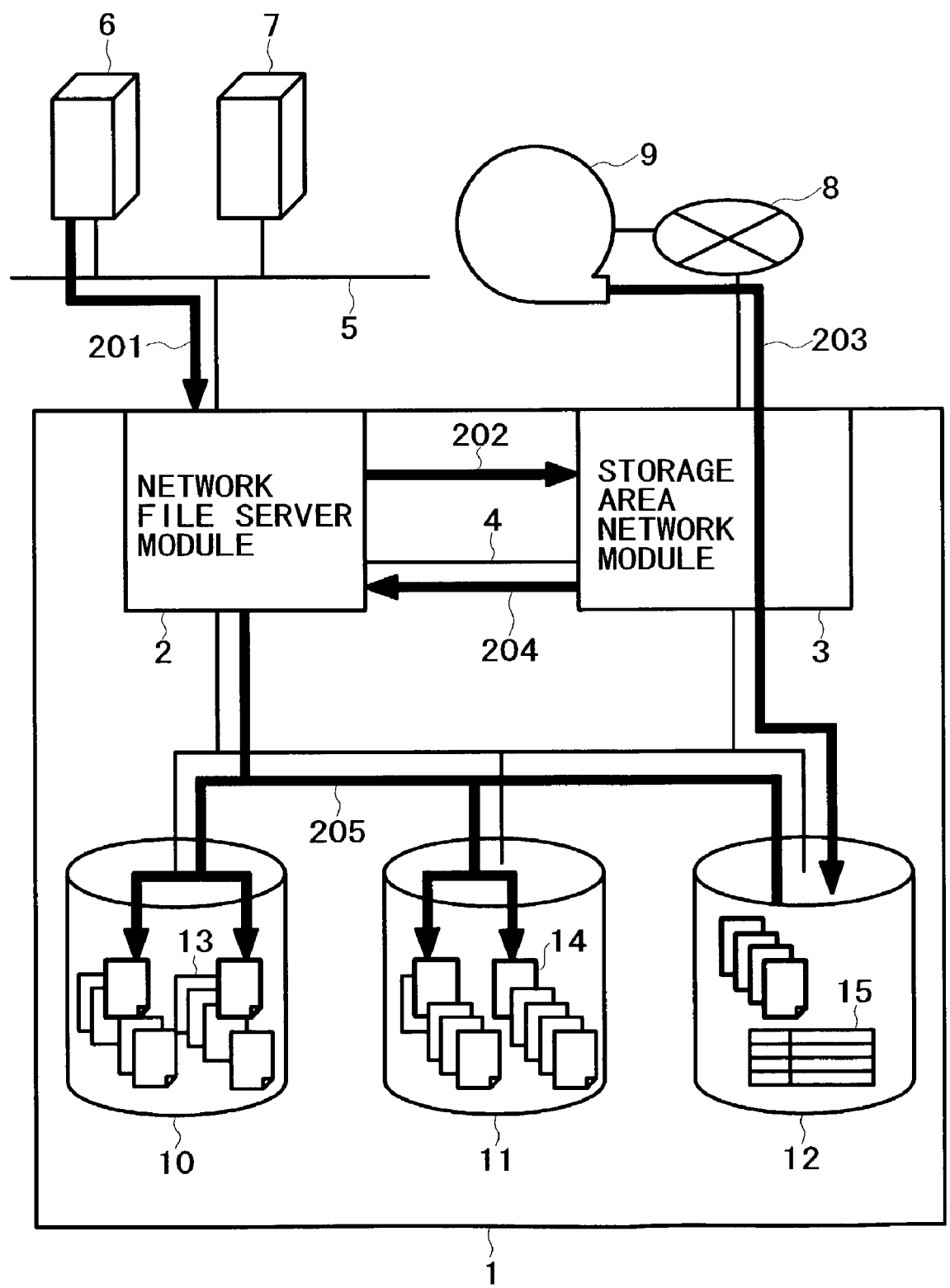
FIG. 2 is a conceptual diagram illustrating a restoration method according to a preferred embodiment of the invention.

As indicated by the reference numeral 201 in FIG. 2, a network file server module 2 of a disk array system 1 receives a restoration request from a disk array system management computer 6 connected to a local area network 5. The restoration request conveys information such as a specified external storage device having the data to be restored and a specified restoration volume 12.

The restoration request does not always have to be received from the disk array system management computer 6 connected to the local area network 5. The request can also be issued by the network file server module 2, which retains the information about the external storage device 9 and restoration volume 12 beforehand.

When two or more units of the external storage device 9 are connected to a storage area network, the restoration request specifies the external storage device 9 that retains the data to be restored. However, the external storage device 9 should not always be specified by the restoration request. The network file server module 2 can retain the data to be restored on accessible regular volumes 10, 11 and reference it for restoration purposes.

[Second Restoration Step]

The network file server module 2 requests the storage area network module 3 to copy to the volume 12 the restoration data that is backed up on the external storage device 9 connected to the storage area network 8. The route of this request is indicated by the reference numeral 202 in FIG. 2. The volume 12 may be different from or identical with the backup volume indicated in FIG. 1. The example in FIG. 2 presumes that the volume 12 is identical with the backup volume indicated in FIG. 1. That is why the same reference numeral is used in these two figures.

[Third Restoration Step]

Upon receipt of a request from the network file server module 2, the storage area network module 3 copies the restoration data to the volume 12 from the external storage device 9, which is connected to the storage area network 8. The data contains the specified volume data and the correlation table 15, which shows the correlation between the specified volume data and the volumes on which the files containing the specified volume data existed. The route for this data copy operation is indicated by the reference numeral 203 in FIG. 2.

More specifically, the backup data copied to the external storage device 9 as explained with reference to FIG. 1 are generally accumulated upon each backup. Meanwhile, the backup volume 12 can store only the latest backup data because it is repeatedly used for backup. When the volume 12 still stores the data to be restored, the data need not be copied from the external storage device 9 to the volume 12 for restoration purposes. The data stored on the volume 12 should be used directly for restoration. In such a situation, the second and third restoration steps are skipped. Further, the restoration data does not always have to be copied to the disk unit's restoration volume 12. It can be copied into the disk array system 1's memory as a virtual volume.

The restoration data recorded in the external storage device 9 is copied to the disk array system 1 via the storage area network 8. Therefore, such a copy operation does not obstruct regular data transfer operations of the local area network 5.

[Fourth Restoration Step]

The storage area network module 3 exercises the inter-module communication function 4 to notify the network file server function 2 that the volume data is completely copied to the restoration volume 12. The route for this notification is indicated by the reference numeral 204 in FIG. 2. Instead of the inter-module communication function 4, a communication function external to the disk array system 1 or the connection between the storage area network module and local area network 5 can be used to effect communication.

[Fifth Restoration Step]

Upon receipt of the notification that the restoration data has been completely copied to the volume 12, the network file server module 2 copies the copied files on the volume 12 to regular volumes 10, 11. The correct correlation between the files and their respective copy destination regular volumes is established by reading the correlation table 15, which is contained in the restoration data copied from the external storage device 9. The route for copying to the regular disk volumes is indicated by the reference numeral 205 in FIG. 2.

The destinations of the restoration files do not always have to be determined by the correlation table 15 on the restoration volume. For example, the network file server module 2 can retain the correlation table 15, which shows the destinations of restoration files, on the accessible regular disk volumes 10, 11 and use it for restoration, or attach the correlation table 15 to the restoration request to indicate the destinations of restoration data.

When the correlation table 15 is used to indicate the destinations of restoration data, predesignated files can be automatically restored. Further, when the correlation table 15 is attached to a restoration request to indicate the destinations of restoration data, it is possible to restore specific files only.

Figure 3:
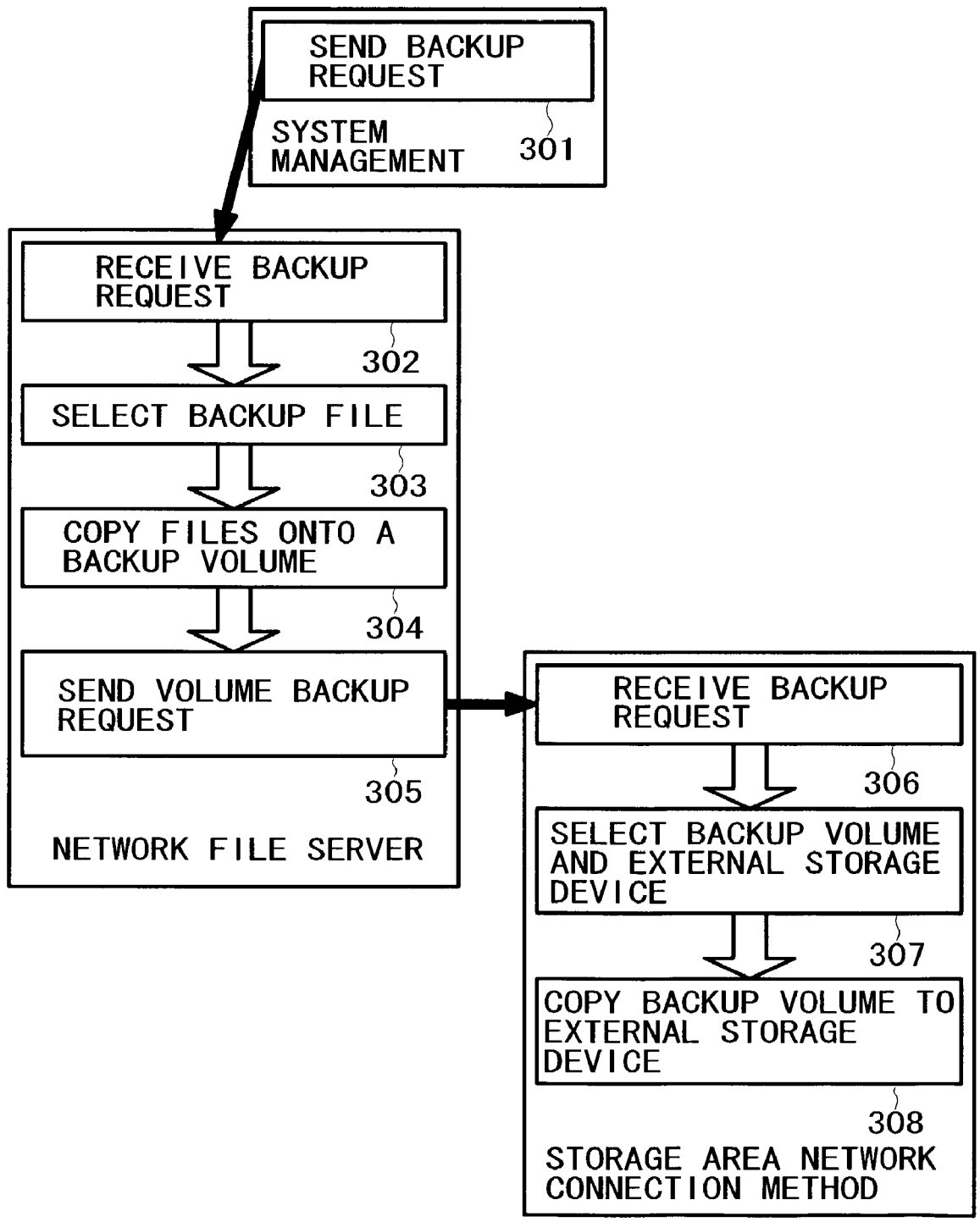
FIG. 3 is a flowchart describing a backup method according to a preferred embodiment of the invention.

FIG. 3 is a flowchart describing a typical backup process according to the above-mentioned preferred embodiment. The backup steps are described sequentially below:

A backup process starts when the management tool of the disk array system transmits a backup request (step 301).

A process existing in the network file server module is waiting for a backup request. The backup request is received by this process (step 302).

The files to be backed up are selected in compliance with the request received by the network file server module (step 303).

The network file server module copies the selected files to the backup volume (step 304).

When the copy operation ends, the network file server module issues a volume backup request to the storage area network module (step 305).

The storage area network module receives the volume backup request (step 306).

In compliance with the backup request, the storage area network module selects a backup volume and external storage device (step 307).

The storage area network module copies the backup volume to the external storage device (step 308).

Figure 4:
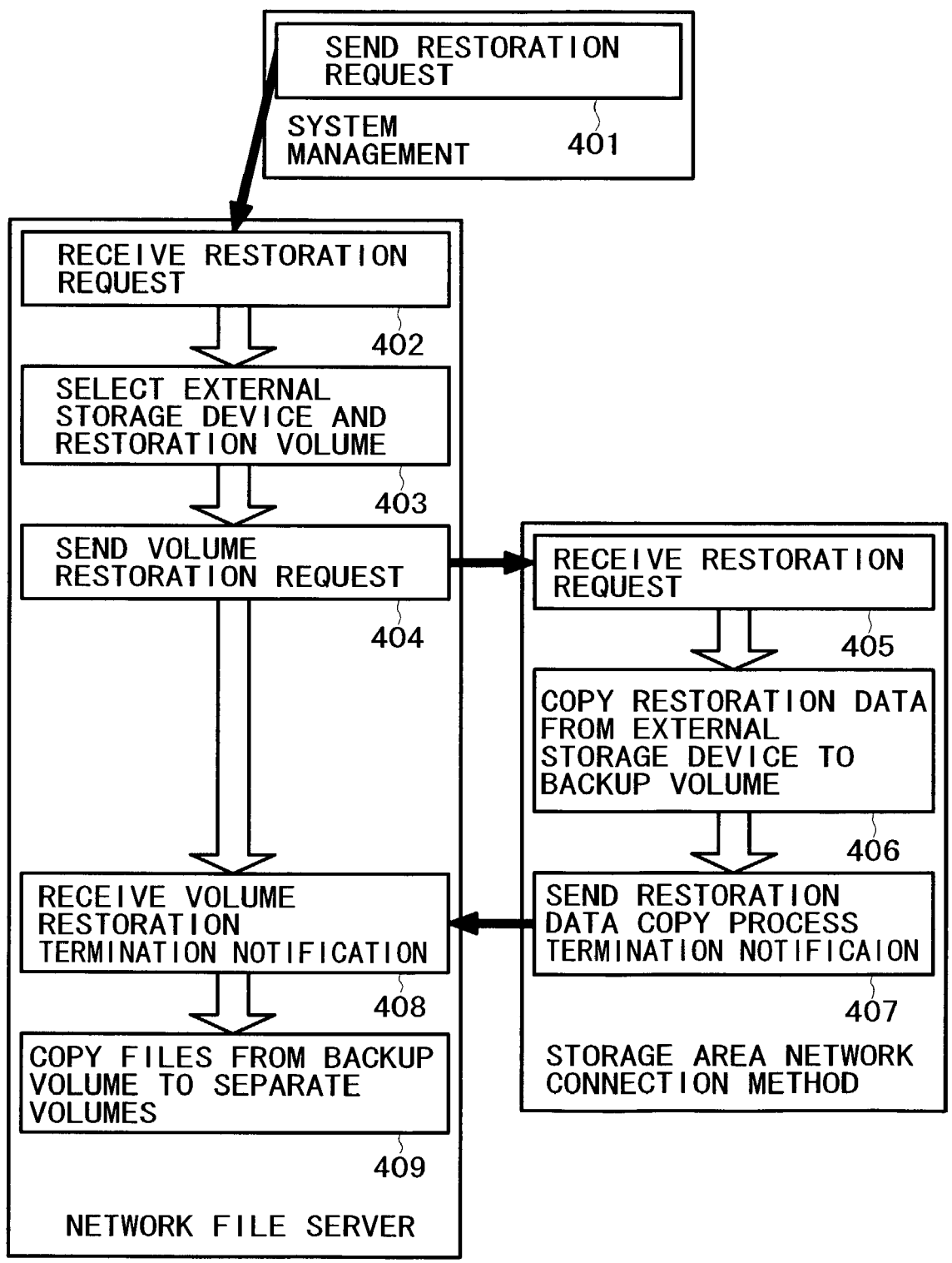
FIG. 4 is a flowchart describing a restoration method according to a preferred embodiment of the invention.

FIG. 4 is a flowchart describing a typical restoration process according to the above-mentioned preferred embodiment.

A restoration process starts when the management tool of the disk array system transmits a restoration request (step 401).

The network file server module receives the restoration request (step 402).

In compliance with the received restoration request, the network file server module selects an external storage device having a specified file backup and a restoration volume within the disk array system (step 403).

A request for restoring the file backup from the selected external storage device to the restoration volume is transmitted from the network file server module to the storage area network module (step 404).

The storage area network module receives this restoration request (step 405).

In compliance with the received restoration request, the storage area network module copies the backup data in the external storage device to the restoration volume (step 406).

When the data copy operation ends, the storage area network function notifies the network file server that the data has been completely copied to the restoration volume (step 407).

The network file sever receives the copy process termination notification (step 408).

The network file server copies the backup data on the restoration volume to a separate volume (step 409). Data restoration is then completed.

When a backup scheme and restoration scheme are created in this manner with the information about the files to be backed up and restored, the backup and restoration processes for a disk array system can be automated.

In the preferred embodiment described above, data is backed up onto an external storage device via the storage area network module 3, which is connected to the storage network 8. In other words, the disk volume copy operation can be performed without regard to the local are network 5, which is used for data exchange during regular operations of the host computer 7. However, a function for connecting to the external storage device 9 can also be used, instead of the storage area network module 3, to achieve data backup and restoration without increasing the load on the local area network 5. For example, the adopted configuration may use a function for connecting to the external storage device via a local area network other than the local area network 5 that is connected to the network file server module 2.

The disk array system of the invention can reduce the time required for backup because the data to be backed up can be limited by its network file server function. It also uses its storage area network function to acquire the data to be backed up, thereby reducing the load on the local area network. In addition, the network file server function and storage area network function distribute the load within the disk array system, which results in an increase the processing speed.

The foregoing invention has been described in terms of preferred embodiments. However, those skilled, in the art will recognize that many variations of such embodiments exist. Such variations are intended to be within the scope of the invention and the appended claims.

What is claimed is:

1. A method for backing up data of a disk array system having a network file server function and a storage area network function, comprising a first functional module configured for the network file server function for permitting access to a plurality of disks and managing the disks on an individual file basis, the first functional module being coupled to a plurality of computers via a local area network, a second functional module configured for the storage area network function for permitting access to the disks on an individual block basis or volume basis, the second functional module being coupled to a storage area network, and communication means for exchanging control information between the first and second functional modules, said method comprising the steps of:

causing said first functional module to copy designated files stored on a first disk volume to a second disk volume for backup purposes upon receipt of a backup request;

notifying said second functional module of a termination of said copy process of said designated files from the first disk volume to the second disk volume and making a request for copying said second disk volume of said designated files to a storage device external to the disk array system via the storage area network; and causing said second functional module to copy said second disk volume of said designated files to the storage device external to the disk array system upon receipt of a notification of the termination of the copy process and the copy request to the storage device external to the disk array system.

2. The method for backing up data according to claim 1, wherein the communication for reporting the termination of the copy process performed from said first functional module to second functional module and making a request for copying to the storage device external to said disk array system is effected by said communication means or effected via the storage device external to said disk array system.

3. The method for backing up data according to claim 1, wherein said backup request is generated from a host external to the disk array system or generated within said first functional module.

4. The method for backing up the data according to claim 1, wherein the step for copying the designated files onto a second disk volume is performed to copy files specified by said backup request or copy a file designated by information entered in a file specified by said backup request.

5. A method for restoring data of files on a disk array system having a network file server function and a storage area network function, comprising a first functional module configured for the network file server function for permitting access to a plurality of disks and managing the disks on an individual file basis, the first functional module being coupled to a plurality of computers via a local area network, a second functional module configured for the storage area network function for permitting access to the disks on an individual block basis or volume basis, the second functional module being coupled to a storage area network, and communication means for exchanging control information between the first and second functional modules, said method comprising the steps of:

causing said second functional module to copy data containing backing-up files for said files to be restored from an external storage device to a specific disk volume for restoration purposes upon receipt of a data restoration request;

notifying said first functional module of a termination of said copy process; and causing said first functional module to copy said backing-up files, on an individual file basis, from said specific disk volume to disk volumes to which the files to be restored should belong upon receipt of the notification of the termination of the copy process.

6. The method for restoring data according to claim 5, wherein said data restoration request is generated from a host or generated within said first functional module.

7. The method for restoring data according to claim 5, wherein the communication for reporting the termination of the copy process performed from said second functional module to first functional module is effected by said communication means or effected via a storage device external to said disk array system.

8. The method for restoring data according to claim 5, wherein the step for causing said first functional module to copy backing-up files from said specific disk volume on an individual file basis is performed by referencing a correlation table stored on said specific disk volume to locate the files to be restored and copying the files to respective disk volumes.

9. The method for restoring data according to claim 5, wherein the step for causing said first functional module to copy backing-up files from said specific disk volume on an individual file basis is performed by copying the backing-up files to respective disk volumes in accordance with a file arrangement scheme specified by said data restoration request.

* * * * *